F. KRITZ.
STORE FRONT CONSTRUCTION.
APPLICATION FILED JAN. 6, 1910.
987,143.
Patented Mar. 21, 1911.
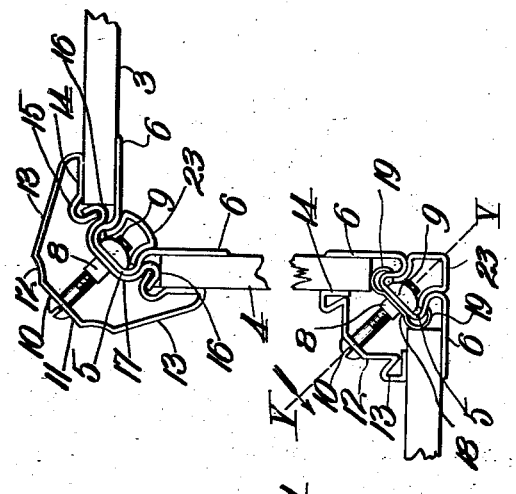
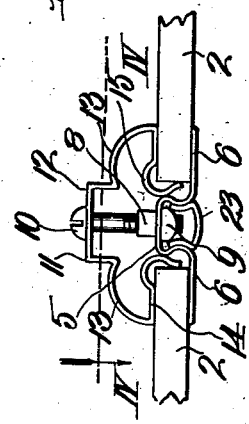
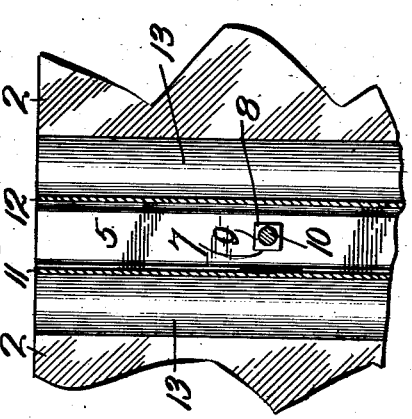
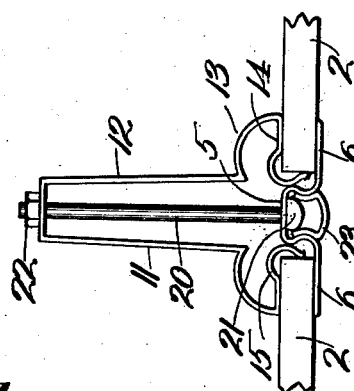
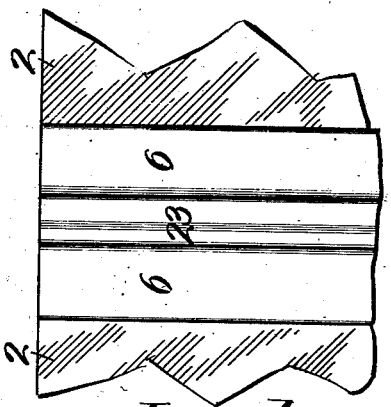
Witnesses
Frank P. Howe
H. C. Rodgers
Inventor
Frank Kritz
By George F. Thorpe Atty.

UNITED STATES PATENT OFFICE.

FRANK KRITZ, OF KANSAS CITY, MISSOURI.

STORE-FRONT CONSTRUCTION.

987,143.

Specification of Letters Patent.

Patented Mar. 21, 1911.

Application filed January 6, 1910. Serial No. 536,721.

*To all whom it may concern:*

Be it known that I, FRANK KRITZ, a citizen of the United States, residing at Kansas City, in the county of Jackson and State of Missouri, have invented certain new and useful Improvements in Store-Front Constructions, of which the following is a specification.

This invention relates to store front construction and more especially to corner bars and division bars for reliably uniting large transparent window plates, my special object being to produce bars of the character mentioned which will hold the transparent plates reliably in position while permitting them to expand and contract edgewise and laterally.

A further object is to produce bars embodying rear plates, front plates provided with grooves in their front faces, means uniting the front and rear plates together and holding them clamped against opposite faces of the adjacent glass plates, and filling strips to fill said grooves and bear against the front ends of the fastening devices to resist forward movement of the latter.

With these general objects in view and others as hereinafter appear, the invention consists in certain novel and peculiar features of construction and organization as hereinafter described and claimed; and in order that it may be fully understood reference is to be had to the accompanying drawing, in which:

Figure 1, is a plan view of a portion of a store front construction embodying my invention. Fig. 2, is a plan view of a modified form of the division bar forming a part of the invention. Fig. 3, is a front view showing adjacent glass plates and the division bar. Fig. 4, is a vertical section on the line IV—IV of Fig. 1. Fig. 5, is a vertical section on the line V—V of Fig. 1.
In the said drawing where like reference characters identify corresponding parts in all of the figures, 1 indicates a portion of a store front, the same showing two alined glass plates 2, a glass plate 3 rearward of the plane of glass plates 2 and a glass end-plate 4, the front and rear ends of the plate 4 terminating adjacent to the contiguous ends of the adjacent plate 2 and plate 3, said plate 4 being shown as arranged at right angles to plates 2 and 3, though it may be arranged at any other angle desired. 5 indicates channeled front plates, said plates being of substantially dovetail shape in cross section, one of the channel plates being arranged between the adjacent ends of each pair of the glass plates, and said channeled plates are provided with outwardly-projecting flanges 6 overlapping and bearing against the outer faces of said adjacent or flanking glass plates, it being noticed by reference to Fig. 1 that the flanges 6 may be in alinement with each other or at an angle to each other. At the outer corner the flanges 6 are bent backward so as to fit against the front sides of the adjacent plates 2 and 4. At the inner corner said flanges will be bent forward so as to fit against the front sides of plates 3 and 4.

The channel plates are provided at suitable points along their longitudinal centers with preferably rectangular holes 7 to receive the squared shanks or stems 8 of nuts 9, the heads of said nuts occupying the channels or grooves in the plates and bearing against the bases of the latter, and engaging said nuts are stove bolts 10 which also extend through the back plates 11.

In all of the types of construction the back plates are provided with a central channel portion 12 to stiffen them, and projecting from the edges of the channel portion are wings 13 terminating in inturned clamp arms 14 bearing flatly against the inner faces of the glass plates, and in the division bar and the reverse or inner corner bar, the inner ends of the arms 14 terminate in hooks 15 which bow inwardly and have their terminals between the adjacent channel plates and the edges of the adjacent glass plates, the hooks 15 of the division bar construction bearing and finding a resistance against the opposite sides of interposed channel plate and exerting a yielding pressure against the edges of the adjacent glass plates. In the reverse or inner corner bar the hooks interlock with the inturned hook-terminals 16 of a U-shaped strip 17 snugly embracing the channel plate for its full length by preference, and fitting upon the rectangular shanks or stems of nuts 9. When the bolts 10 of the inner or reverse corner bar are screwed home, the interlocked hooks 15 and 16 keep the wings 13 from spreading so that the outer ends of said wings and the clamping arms 14 shall tend to swing together with the said hooks as the fulcrum point, it being obvious that in such inner corner or reverse bar the tendency of said wings unless anchored substantially as shown, would be to spread apart and thus fail to exert the required clamping pressure upon the glass plates 3 and 4. In the outer corner bar or what may be called the obverse corner construction, the pressure imposed by the back plate, is substantially at right angles to the resistance offered by the opposing flanges 6 and hence it is not necessary to provide the auxiliary strip 17 as an anchor for the wings 13.

For the purpose of yieldingly resisting approaching movement on the part of the adjacent glass plates 2 and 4, I preferably employ two or more spring metal plates 18 to fit flatly against the rear side of the channel plate and to rest by preference upon the shanks of the nuts 9, said plates terminating in spring-hooks 19 to snap upon the channel plate and bear against the adjacent edges of said glass plates 2 and 4. By thus snapping the hook-terminals upon the channel plate it is impossible for them to move or work rearward from between the glass plates and by standing them upon the nuts as explained they cannot slide or work downward beyond their respective underlying nuts.

In Fig. 2 the channel or stiffening portion 12 of the back plate 11 is shown of considerably greater depth than in the remaining figures, and is adapted for use where especially large glass plates are employed. In said figure also the bolt numbered 20 is of greater length and it extends through the channel plate with its head 21 occupying the channel thereof, a nut 22 engaging the rear end of the bolt rearward of the portion 12. In both types of construction shown the front channel plate is reinforced against collapse, that is against approaching movement of the side walls of the channel, by a filling strip 23, which strip is preferably hollow and of substantially dovetail form so as to interlock with the dovetail portion of the front plate, the arrangement being such that the resistance of the filling strip to collapsing movement of the walls of the front plate, increases as the collapsing pressure on said walls becomes greater, it being also noted that the inner portions of the arms of the filling strip fit against the outer faces and opposite sides of the nuts or bolts 9 or 21 as the case may be, and thus tend to prevent outward movement of said nuts or bolts and utilize the resistance of the same to collapsing or inward pressure imposed by the side walls of the front channel plate, the filling strips furthermore forming a closure for the channel of the front plate and hiding the nuts or bolts from view and inaccessible to a person at the outer side of the window.

The filling strips are of such type that they can be pressed into the dovetailed channel, their arms yielding inward under such pressure and then snapping outward and interlocking with the side portions of the channel plates.

I am aware that store front constructions have been patented in which front channel plates have been equipped with filling strips, but in none of such constructions as far as I know, are the channel plates of dovetail shape in cross section, nor can the filling strips be snapped into place. Furthermore in the patented construction embodying filling strips above referred to, the strips engage the inner or rear faces of the nuts or bolt heads as distinguished from those shown herein where the arms of the filling strips bear against the outer faces of the nuts and bolts. It will also be apparent that any outward movement of the bolts or nuts of my construction is prevented by the filling strip because of its interlocked relation with the channel, whereas in the patented structures above mentioned the filling strips resist forward movement only of the nuts or bolts.

From the above description it will be apparent that I have produced a store front construction embodying the features of advantage enumerated as desirable which is obviously susceptible of modification in various particulars without departing from the spirit and scope or sacrificing any of the advantages of the appended claims.

Having thus described the invention what I claim as new and desire to secure by Letters-Patent, is;

1. A store front construction, comprising a pair of glass plates disposed a slight distance apart, a channeled face-plate arranged between the edges of the said plates and provided with flanges overlapping and bearing against the outer faces of said plates, a back plate overlapping and bearing against the rear faces of said glass plates, means connecting the front and back plates together to cause them to press firmly upon the interposed glass plates, and a filling strip forming a closure for said channel and bearing a dovetail relation thereto with the rear edges of its arms bearing against the said means to prevent forward movement of the same and braced against inward movement by said means to resist inward movement of the walls of the channel plate.

2. A store front construction, comprising a pair of glass plates disposed a slight distance apart, a channeled face-plate arranged between the edges of the said plates and provided with flanges overlapping and bearing against the outer faces of said plates, a back-plate overlapping and bearing against the rear faces of said glass plates, means connecting the front and back plates together to cause them to press firmly upon the interposed glass plates, a filling strip forming a closure for said channel and bearing a dovetail relation thereto, and a plate bearing against the rear side of the channeled portion of the front plate and interlocked therewith and pressing in opposite directions against the adjacent edges of said glass plates.

3. In a store front construction, a pair of glass plates, a front plate embodying a channeled portion arranged between the edges and flanges bearing against the front faces of said glass plates, a back plate bearing against the rear faces of the glass plates and bridging the space between their edges, a nut arranged in the channel of the front plate, a bolt extending through the back and front plates and engaging said nut, and a hollow resilient dovetail filling strip fitting in and forming a closure for the channel of the front plate and yieldingly interlocked therewith; the rear edges of the arms of the hollow filling strip engaging the said nut to prevent forward movement of the same and being braced by said nut against the side walls of the channeled front plate to prevent inward movement of the said walls.

In testimony whereof I affix my signature, in the presence of two witnesses.

FRANK KRITZ.

Witnesses:
HELEN C. RODGERS,
M. A. O'DONNELL.